Figure 1:
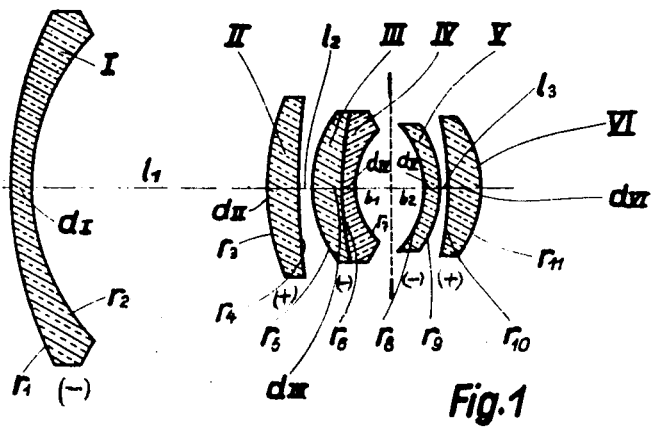

May 28, 1957   H. ZÖLLNER ET AL   2,793,565
PHOTOGRAPHIC OBJECTIVE COMPRISING A REAR COLLECTIVE
PART AND A FRONT DISPERSIVE MENISCUS PART
Filed April 26, 1955

Inventors:

United States Patent Office 2,793,565
Patented May 28, 1957

2,793,565

PHOTOGRAPHIC OBJECTIVE COMPRISING A REAR COLLECTIVE PART AND A FRONT DISPERSIVE MENISCUS PART

Harry Zöllner and Rudolf Solisch, Jena, Germany, assignors to VEB Carl Zeiss Jena, Jena, Germany Application April 26, 1955, Serial No. 503,925

1 Claim. (Cl. 88—57)

This invention relates to an objective for photographic purposes of the kind containing a collective and a dispersive part, said dispersive part lying at a relatively great distance in front of said collective part and being formed as a meniscus in such a manner that the rear main point of the objective lies adjacent to the hindmost surface of said collective part, said meniscus comprising only one lens which consists of crown-glass its Abbe number being greater than 55 and smaller than 65, said collective part being a lens system of the so-called "Gauss" type, comprising two dispersive meniscus members situated on opposite sides of a diaphragm and facing each other with its concave surfaces, the front one of these two members consisting of two cemented lenses, while the rear one is a single lens, said collective part furthermore comprising two collective members one of which being a single lens lying in front of said two dispersive meniscus members, while the other one which has the form of a meniscus lies behind said two dispersive meniscus members and comprises at least one but not more than two lenses.

With a view to obtaining an objective of this kind which exhibits high light intensity, good correction of spherical aberration and coma and has a focal field which is levelled out for large lens angles and is free from astigmatism, the objective according to the invention is constructed so as to possess the following characteristics.

The collective single lens, which forms the foremost lens of the collective part, consists of flint glass and its Abbe number is greater than 40 and smaller than 50.

The difference between the refractive indices of the two cemented lenses constituting the front dispersive meniscus member of the collective part is greater than 0 and smaller than 0.2.

The refractive index of the lens constituting the rear dispersive meniscus member is greater than 1.7.

The refractive index of all lenses of the collective meniscus which forms the rearmost member of the collective part is greater than 1.6 and smaller than 1.7.

Each of the two absolute values of the radii of the facing concave surfaces of the dispersive meniscus members which are adjacent to the diaphragm is greater than 0.2 times and smaller than 0.3 times the focal length of the objective.

The space between the dispersive part and the collective part is greater than 0.45 times and smaller than 0.6 times the constructional length of the objective.

In order that the invention may be more clearly understood two embodiments of an objective according thereto are illustrated by way of example only in the accompanying drawings which embodiments fulfill the aforementioned conditions.

Figure 2:
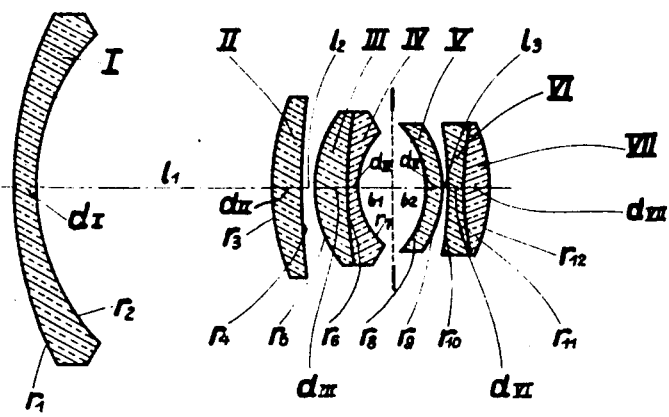

In the drawings:

Figure 1 shows a first embodiment of an objective the rearmost member of which is uncemented and Figure 2 shows a second embodiment, wherein the rearmost member is constituted by two cemented lenses.

The following tables contain the numerical values of the objectives illustrated in the drawings and presuppose for both objectives a total focal length of 100 units.

First embodiment (Figure 1)

| Radii | Thicknesses and distances | |
|---|---|---|
| $r_1 = +113.42$ | $d_I = 6.74$ | $55 < \nu_I < 65$ |
| $r_2 = + 64.09$ | | $40 < \nu_{II} < 50$ |
| $r_3 = + 75.83$ | $l_1 = 72.83$ | $0 < n_{IV} - n_{III} < 0.2$ |
| | $d_{II} = 8.09$ | $n_V > 1.7$ |
| $r_4 = \infty$ | | $1.6 < n_{VI} < 1.7$ |
| $r_5 = + 30.48$ | $l_2 = 5.39$ | $20 < r_7 < 30$ |
| $r_6 = +167.09$ | $d_{III} = 9.71$ | $20 < r_8 < 30$ |
| $r_7 = + 21.91$ | $d_{IV} = 3.24$ | $0.45L < l_1 < 0.6L$ |
| $r_8 = - 25.40$ | $\begin{cases} b_1 = 7.55 \\ b_2 = 8.09 \end{cases}$ | |
| $r_9 = - 37.41$ | $d_V = 3.24$ | |
| $r_{10} = -237.54$ | $l_3 = 0.27$ | |
| $r_{11} = - 36.14$ | $d_{VI} = 9.31$ | |
| | Constructional length: $L = 134.46$ | |

Type of glass

| Lens | I | II | III | IV | V | VI |
|---|---|---|---|---|---|---|
| $n_d$ | 1.6224 | 1.6051 | 1.6583 | 1.6645 | 1.7588 | 1.6224 |
| $\nu$ | 60.3 | 42.2 | 51.0 | 35.9 | 26.7 | 60.3 |

Second embodiment (Figure 2)

| Radii | Thicknesses and distances | |
|---|---|---|
| $r_1 = +116.42$ | $d_I = 6.89$ | $55 < \nu_I < 65$ |
| $r_2 = + 65.01$ | | $40 < \nu_{II} < 50$ |
| $r_3 = + 67.32$ | $l_1 = 73.06$ | $0 < n_{IV} - n_{III} < 0.2$ |
| | $d_{II} = 8.13$ | $n_V > 1.7$ |
| $r_4 = +561.28$ | | $1.6 < n_{VI} < 1.7$ |
| $r_5 = + 30.55$ | $l_2 = 1.24$ | $1.6 < n_{VII} < 1.7$ |
| $r_6 = + 68.68$ | $d_{III} = 9.65$ | $20 < r_7 < 30$ |
| $r_7 = + 21.89$ | $d_{IV} = 3.31$ | $20 < r_8 < 30$ |
| | $\begin{cases} b_1 = 9.37 \\ b_2 = 11.03 \end{cases}$ | $0.45L < l_1 < 0.6L$ |
| $r_8 = - 26.36$ | $d_V = 3.31$ | |
| $r_9 = - 37.41$ | $l_3 = 0.28$ | |
| $r_{10} = -224.90$ | $d_{VI} = 2.76$ | |
| $r_{11} = +183.48$ | $d_{VII} = 8.13$ | |
| $r_{12} = - 37.84$ | Constructional length: $L = 137.16$ | |

In the upper part of the tables "First embodiment (Figure 1)" and "Second embodiment (Figure 2)" the radii of curvature $r$ are numbered in the first column from front to rear, in the second column are given the thicknesses $d$ of the lens elements, the spaces $l$ between components and the constructional length L of the objective, and in the third column are given the conditions to be performed according to the claim. In the lower part—Type of glass—the first line numbering the lens elements and in the following two lines the corresponding refractive indices $n$ for the $d$-line of the spectrum and the dispersive indices $\nu$ are given.

Type of glass

| Lens | I | II | III | IV | V | VI | VII |
|---|---|---|---|---|---|---|---|
| $n_d$ | 1.6224 | 1.6051 | 1.6583 | 1.6645 | 1.7588 | 1.6204 | 1.6624 |
| $\nu$ | 60.3 | 42.2 | 51.0 | 35.9 | 26.7 | 36.3 | 60.3 |

We claim:

Photographic objective comprising a collective and a dispersive part, said dispersive part lying at a relatively great distance in front of said collective part and being formed as a meniscus in such a manner that the rear main point of the objective lies adjacent to the hindmost surface of said collective part, said meniscus comprising only one lens which consists of crown-glass, its Abbe number being greater than 55 and smaller than 65, said collective part, being a lens system of the so-called "Gauss"-type, comprising two dispersive meniscus members lying at different sides of a diaphragm and facing each other with its concave surfaces, the front one of these two members consisting of two cemented lenses, while the rear one is a single lens, said collective part furthermore comprising two collective members one of which being a single lens lying in front of said two dispersive meniscus members, while the other one, which has the form of a meniscus, lies behind said two dispersive meniscus members and comprises at least one but not more than two lenses, said collective single lens consisting of flint glass and its Abbe number being greater than 40 and smaller than 50, the difference between the refractive indices of said two cemented lenses being greater than 0 and smaller than 0.2, said rear dispersive single lens having a refractive index greater than 1.7, while the refractive index of all lenses of said other collective member situated behind said two dispersive meniscus members being greater than 1.6 and smaller than 1.7, each of the absolute values of the radii of said two concave surfaces facing each other being greater than 0.2 times and smaller than 0.3 times the focal length of the objective, the space between said dispersive part and said collective part being greater than 0.45 times and smaller 0.6 times the constructional length of the objective.

References Cited in the file of this patent
UNITED STATES PATENTS

| | | |
|---|---|---|
| 1,862,950 | Ball | June 14, 1932 |
| 1,910,492 | Mellor | May 23, 1933 |
| 1,934,561 | Rayton | Nov. 7, 1933 |
| 1,955,590 | Lee | Apr. 17, 1934 |
| 2,126,126 | Merte | Aug. 9, 1938 |
| 2,559,844 | Bennett | July 10, 1951 |
| 2,649,022 | Angenieux | Aug. 18, 1953 |